(12) United States Patent
Arias Lopez

(10) Patent No.: US 7,753,763 B2
(45) Date of Patent: Jul. 13, 2010

(54) MULTI-LAYER ARRANGEMENT METHOD FOR A TUBULAR NET ON A SUPPORT TUBE

(75) Inventor: Juan Luis Arias Lopez, Pamplona (ES)

(73) Assignee: Viscofan, S.A., Pamplona (ES)

( * ) Notice: Subject to any disclaimer, the term of this patent is extended or adjusted under 35 U.S.C. 154(b) by 0 days.

(21) Appl. No.: 12/362,181

(22) Filed: Jan. 29, 2009

(65) Prior Publication Data
US 2009/0136694 A1 May 28, 2009

Related U.S. Application Data

(60) Division of application No. 11/211,117, filed on Aug. 24, 2005, now Pat. No. 7,641,541, which is a continuation of application No. PCT/ES2003/000090, filed on Feb. 25, 2003.

(51) Int. Cl.
*A22C 11/00* (2006.01)
(52) U.S. Cl. .................................................. 452/21
(58) Field of Classification Search ............ 452/21–23, 452/25, 30–32, 35–37, 46–48, 51
See application file for complete search history.

(56) References Cited

U.S. PATENT DOCUMENTS

| 5,273,481 A * | 12/1993 | Sullivan ...................... 452/24 |
| 7,051,415 B2 * | 5/2006 | Pinto et al. ................. 29/455.1 |
| 7,494,405 B2 * | 2/2009 | Arias Lopez ................. 452/32 |

* cited by examiner

*Primary Examiner*—Thomas Price
(74) *Attorney, Agent, or Firm*—Notaro, Michalos & Zaccaria P.C.

(57) ABSTRACT

A tubular net arrangement is made by placing a tubular net on a transfer tube and inserting a support tube coaxially inside the transfer tube. The support tube has a support tube diameter that is smaller than the transfer tube diameter. The tubular net is then moved off the transfer tube and past the end of the transfer tube to fold the tubular net onto the support tube in the form of multiple successive concentric layers. The transfer tube then moves relative to the support tube to expose the support tube as the layers are formed on the support tube. The inner diameter of each layer is adjacent the support tube and is equal to the support tube diameter and the outer diameter of each layer is spaced away from the support tube and is greater than the support tube diameter and at most equal to the transfer tube diameter.

3 Claims, 3 Drawing Sheets

MULTI-LAYER ARRANGEMENT METHOD FOR A TUBULAR NET ON A SUPPORT TUBE

CROSS-REFERENCE TO RELATED APPLICATION

This is a divisional application of U.S. patent application Ser. No. 11/211,117 filed Aug. 24, 2005, now U.S. Pat. No. 7,641,541, which was is a continuation of International Application PCT/ES2003/000090 filed on Feb. 25, 2003, now International Publication WO2004/075638, the contents of which are herein wholly incorporated by reference.

OBJECT OF THE INVENTION

The present invention relates to a method of arrangement in concentric layers (multi-layer) of a tubular net on a support tube with a diameter smaller than the maximum diameter of the net when stretched, the purpose of which is to secure the loading of a larger amount of net on said tube and at the same time permit a smooth unloading or unfolding thereof.

Another object of the invention is the device to obtain the multi-layer arrangement of the net, which consists of a net transfer tube of larger diameter than the support tube and a support tube of smaller diameter than the maximum diameter of the net when stretched, which is disposed concentrically to it.

Likewise, another object of the invention is the method of folding the net in a multi-layer arrangement, which makes use of a suitable loader to slide the net over the whole length of the transfer tube until it falls in an orderly fashion, forming concentric layers on the support tube.

The loading or multi-layer folding on a support tube has special application to the sector engaged in packaging or inserting foods, mainly meat products, packaged in a double wrapping formed of an inner lamination and an outer elastic tubular net. Its application is not ruled out either in other fields in which the execution of the method and use of the device may be feasible for obtaining the multilayer arrangement of nets of a different type.

BACKGROUND TO THE INVENTION

The present invention is mainly encompassed within the framework of food product packaging and, more specifically, in the meat industry field. There is a large variety of products that are wrapped in laminations for their processing, handling and/or preservation. The use of the lamination is supplemented in many cases with a tubular net and is particularly applicable to special products where the appearance of the product is important.

The lamination and net assemblage form a wrapping in which the main functions of the lamination are to prevent excessive evaporation during the heating process, permit smoking, provide sheen, colour and appearance to the surface of the product, facilitate the removal of the net and also of the actual lamination in the event of this not being edible, and in addition it should be soft enough to allow the net to transmit its imprint to the product, giving it a typical appearance. The use of the lamination and net further permits the use of diced meat and cuts of different sizes and qualities, including meat emulsions and fine pastes, either on their own or combined with the former in different proportions, as the lamination and net assemblage confines and secures the product inserted in its interior until it coagulates and binds during the heating process, thereby permitting the making of reconstituted meat products.

At the present time laminations and nets are applied in the food industry either manually or by mechanical means. For this purpose the laminations are supplied either in cut sheets or else in rolls of varying length that may range from 5 to 250 meters. The nets come in roll form with minimum lengths of 50 meters. A manual form of application consists of wrapping the food product with the laminations and covering it with the net by sliding it through the inside of a hollow cylinder or metal tube that acts as a carrier for a certain amount of tubular net, which has been folded or compressed on it coaxially, and drawing the product out of the other end of the cylinder together with the net with which it is thereby covered. This procedure is described in U.S. Pat. No. 4,621,482 (Crevasse, Gammon, Sullivan 1986). An even more elementary procedure is described in U.S. Pat. No. 4,719,116 (Crevasse 1988).

The mechanical procedure is carried out by means of so-called "applicators", which execute the wrapping of the product with the lamination and with the net at the same time. A typical applicator consists of a lamination roll holder, a device for forming a cylinder from the lamination, and a tube running through the interior of the lamination tube formed and through which the food product is passed. A tube in which a given amount of net is loaded is arranged concentrically to the foregoing assemblage. The end of the tube formed of the lamination and the end of the compressed portion of net are taken in conjunction to a point ahead of the open end of the insertion tube and are closed together by means of a clip, knot or some other appropriate system, so that the system is ready to be inserted either by mechanical pumping or else by means of a hand or air-operated piston. On being forced out of the tube, the product pulls the lamination and the net at the same time, so that in this way it is wrapped by both. This procedure and the device for carrying it out are described in U.S. Pat. Nos. 4,910,034 (Winkler 1990) and 4,958,477 (Winkler 1990), respectively.

To compress the nets on the outer coaxial tube which is used for forcing in the meat according to the traditional method, a loader device is employed. This consists of a tube with a cone-shaped termination on one end, which facilitates the loading of the net, and of a ring-shaped loader device with a diameter slightly larger than that of the tube, provided with a pair of handles so as to be able to handle it manually. Its interior portion has a series of teeth angled in the direction of loading, so that, once disposed around the net tube and the latter has been threaded into the tube, it draws the net when pushed from the end to the base and slides over the net due to the orientation of its teeth, when the opposite movement is executed. The tubes used in the procedures described above are of large diameter, with the result that the elastic net is loaded tightly stretched and exerts considerable pressure on the tube. On account of this only a small amount of net may be stored on the tube, as the actual net stored at the end of the tube prevents more from being loaded in that area. This also means that for the unloading or unfolding of the net it is necessary to exert a certain force, so that the unloading or unfolding is not performed smoothly. In the same way, as the tube goes on being loaded with net, the front of the net loaded moves further away from the end of the tube, so that the back and forth movements of the loader become shorter and shorter and the amount of net loaded is smaller, making the manual loading of the net increasingly slower and more laborious.

This operation can also be done mechanically. Devices for this purpose are described in U.S. Pat. Nos. 5,273,481 (Sullivan 1993) and 4,924,552 (Sullivan 1990).

DESCRIPTION OF THE INVENTION

The object of the invention consists of a multi-layer arrangement of a tubular net on a support tube of a smaller diameter than those used traditionally, capable of storing a larger amount of net without it being stretched over said tube, so that it may be unloaded in a smooth and orderly fashion. For this purpose a net folding method is used together with a device consisting of a transfer tube of a diameter larger than the support tube, which is superimposed on the latter. The net is threaded into this transfer tube and a toothed loader, similar to the one used in the traditional method, and slides the net over the outside of the transfer tube as far as the end thereof. Said end has a slightly frustoconical area, so that the net that the loader draws out on each of its back and forth movements falls on to the support tube, due to its elastic tension, and the latter is gradually loaded with the net, which is steadily arranged in concentric layers along its whole length. The maximum diameter of the outer layers is the same as that of the transfer tube, so that this diameter is controlled all the time.

By means of this system a larger amount of net may be loaded on the support tube than is loaded with the traditional method. This is due both to the use of a smaller diameter support tube and to the loading system by way of the transfer tube, of a diameter similar to that of the traditional system, which permits the concentric layering of the net all along the tube. The amount of net loaded is what the tube is capable of holding in the volume comprised between the transfer tube and the support tube. Since the support is of smaller diameter, the amount of net loaded will always be greater, providing the system with a longer operating time between stops to replenish the net.

The diameter of the transfer tube determines the maximum tension of the diameter of the net during loading and unloading, and the diameter of the support tube determines the resistance that the net, after being unfolded, is going to oppose to its traction along the tube. As this diameter is smaller, this resistance will be minimum and the unloading smooth.

As already explained, in the traditional manual net loading method, as the support tube is loaded, the amount of net loaded in each back and forth movement becomes smaller, which makes the loading of the final meters very laborious. In the method proposed, every movement always permits the loading of the amount of net corresponding to the length of the transfer tube, so this problem is resolved.

In its manual application the device for the implementation of the afore-mentioned method comprises the smaller diameter support tube, the transfer tube, and the net loader. For its mechanical application all that is required is to interpose a transfer tube in a conventional mechanical folder like those described in U.S. Pat. Nos. 5,273,481 (Sullivan 1993) and 4,924,552 (Sullivan 1990), so that the same operations as described above are performed mechanically.

DESCRIPTION OF THE DRAWINGS

To supplement the description being given and in order to assist a clearer understanding of the features of the invention, in accordance with a preferred specimen practical embodiment thereof, a set of drawings is attached as an integral part of this description, wherein for merely informative and non-restrictive purposes the following is represented.

PREFERRED EMBODIMENT OF THE INVENTION

Figure 1:
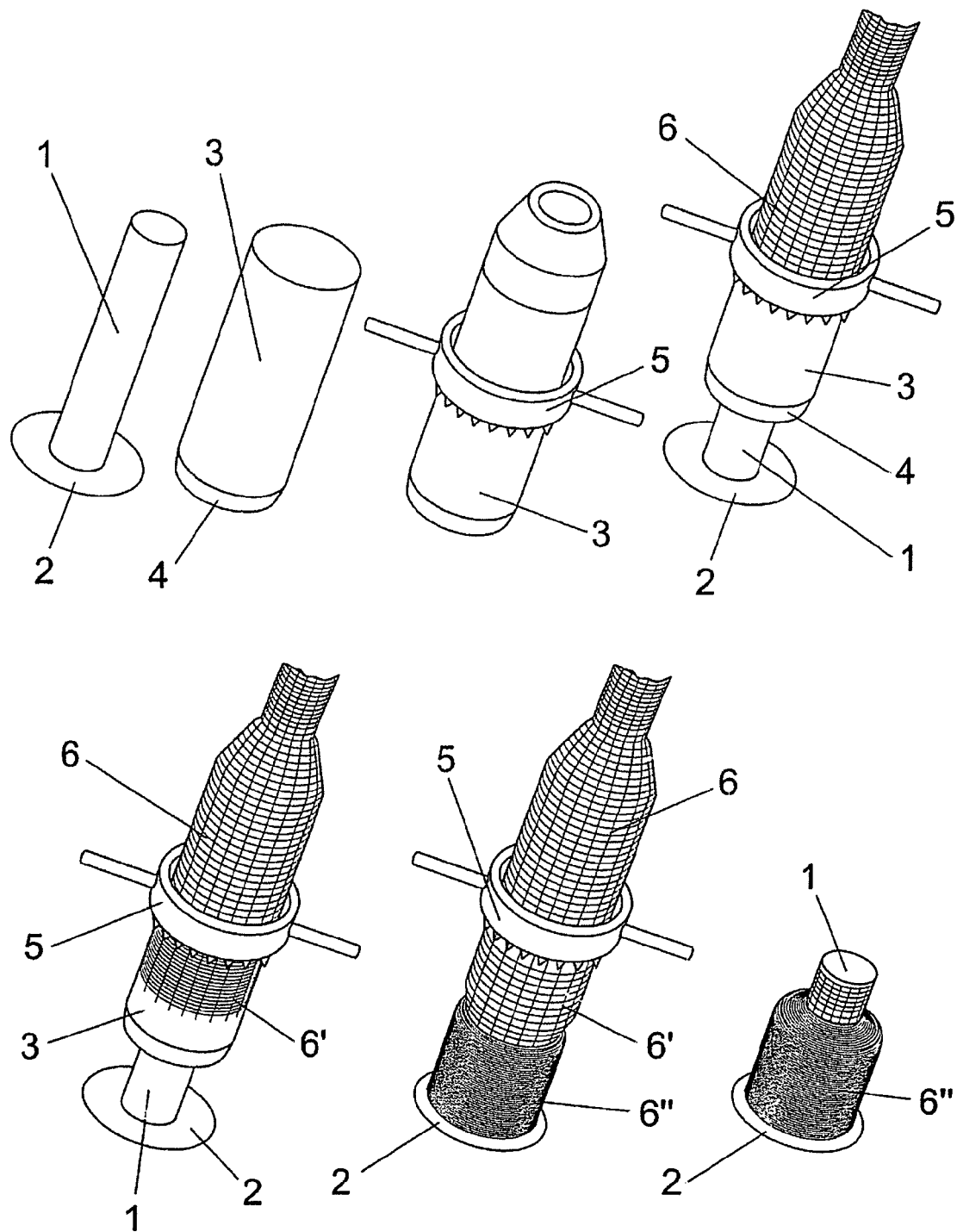
FIG. 1 is a perspective diagrammatic representation, illustrating the necessary items for the multi-layer arrangement of a tubular net on a support tube, besides the successive multi-layer tubular net loading stages, in compliance with the object of the invention.

The multi-layer arrangement of the invention, FIG. 1, is obtained simply by means of the same system of folding of the traditional net, making use of an additional tube (3) which, far from complicating the system, facilitates it: the first operations are carried out in a similar way to the conventional system, with the sole difference that, instead of being done on the support tube (1), which will be of smaller diameter in this case, they are executed on a transfer tube (3), of similar diameter to the net tube on the conventional system, the lower end of which has a frustoconical area of a few centimeters (4) to facilitate the transfer of the net to the final net tube (support tube (1)), as we will explain later. Once the transfer tube has been appropriately threaded with the net (6) and this has been trapped on the teeth of the loader (5), the support tube (1) is placed inside this transfer tube (3) and the net (6') starts to be pressed towards the lower end of the support tube (1), which continues to be concealed in the transfer tube and only its base remains (2) visible. When the net reaches the lower end of the transfer tube (3), it is accumulated in the frustoconical area, and as soon as the downward pressure ceases, due to the fact that the loader begins its upward travel, the net falls of its own accord on to the support tube (1) on account of the special shape of the end of the tube. When all these operations are repeated successively, the support tube (1) is gradually loaded in an orderly fashion with the net (6"), which occupies all the space between the support tube (1) and an imaginary coaxial tube on the outside of the former, of similar diameter to the transfer tube. As the support tube (1) is loaded, the transfer tube (3) ascends, resting on the loaded net (6"), so that all the individual loading operations have the same travel and load the same amount of net, which is equivalent to the length of the transfer tube (3), unlike the traditional method in which, as the net is loaded, the amount of net that is folded or loaded becomes smaller, which does not permit the utilisation of the whole length of the support tube.

Figure 2:
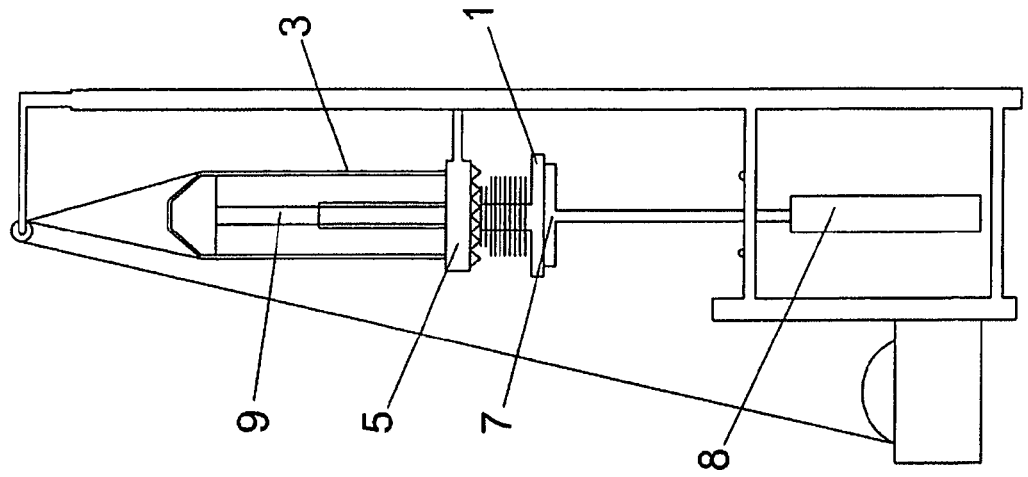
FIG. 2 is a side view showing how a conventional device for loading the net can be employed for the orderly multi-layer loading of the net on a small diameter tube by means of the additional use of an external transfer tube of larger diameter than the support tube according to the invention.
Figure 2:
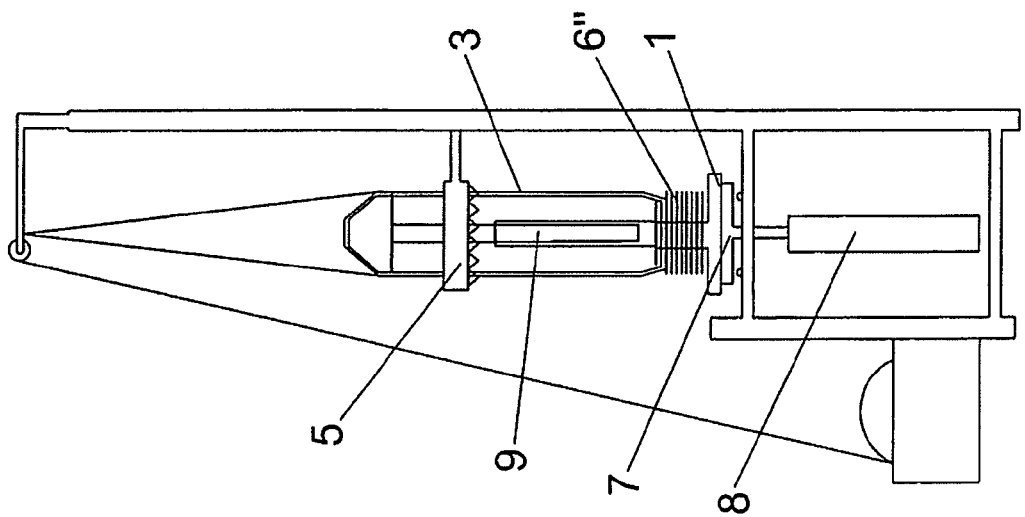
Figure 2:
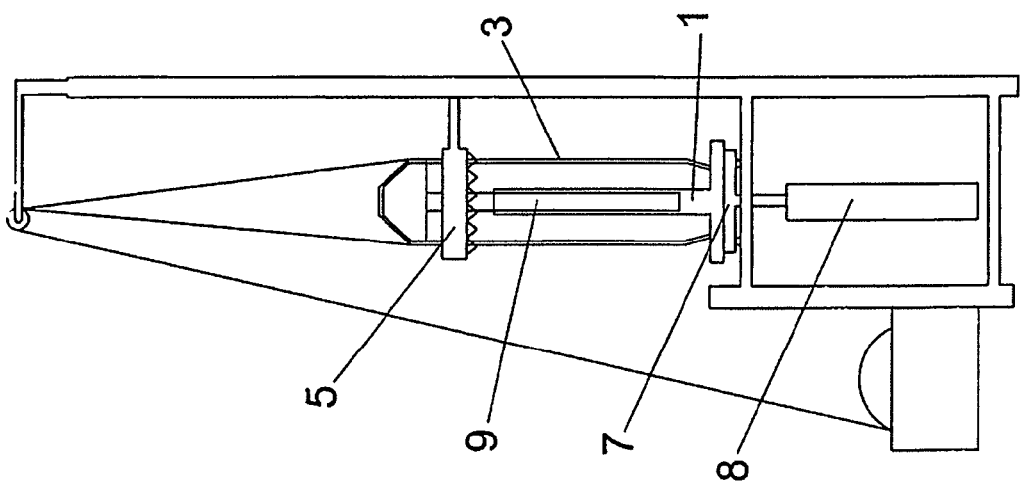

In FIG. 2 it may be seen how the method described above, which refers to the manual folding method, may be applied by using the same additional items, i.e. by attaching a transfer tube (3) to the conventional mechanical net folding system, in which the net tube (1) is set in place on a platform (7) to which an air piston (8) communicates an up and down to and fro movement. The net loader (5) is fixed in this case but the relative movement of this in respect of the tube and the net is the same as in the case of manual loading. In this case the transfer tube (3) has an inner guide (9) which is inserted inside the net tube to confer rigidity on the system. This inner guide may also be used for manual folding.

Figure 3:
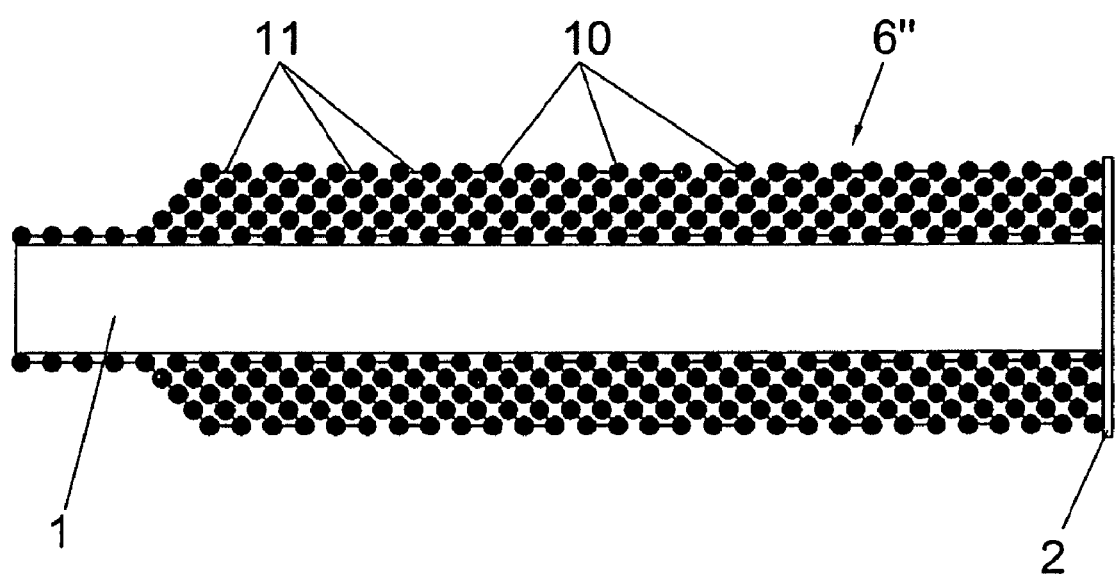
FIG. 3 is a diagrammatic cross section of the multi-layer arrangement of the net loaded on a support tube, the elastic thread section being represented by dots and the non-elastic threads of the net by lines.

FIG. 3 shows a diagrammatic section of the multi-layer arrangement of the net (6") loaded on the support tube (1), the elastic thread section (10) being represented by dots and the non-elastic threads (11) of said net (6") by lines.

FIG. 3 shows a diagrammatic section of the multi-layer arrangement of the net (6") loaded on the support tube (1), the elastic thread section (10) being represented by dots and the non-elastic threads (11) of said net (6") by lines. As shown in FIG. 3, each of the many successive concentric layers of tubular net 6", that have been folded, one next to the other, onto the support tube 1, have an inner diameter near the support tube (1) that is equal to the diameter of the support tube, and an outer diameter spaced away from the support tube, that is greater than the support tube diameter, and that is at most equal to the diameter of the transfer tube (3).

What is claimed is:

1. A method of making a tubular net comprising:

placing a tubular net on an outside of a transfer tube having a transfer tube diameter and an end;

inserting a support tube coaxially inside the transfer tube, the support tube having a support tube diameter that is smaller than the transfer tube diameter;

moving the tubular net off the transfer tube and past the end of the transfer tube to fold the tubular net onto the support tube in the form of a multiplicity of successive concentric layers on the support tube; and moving the transfer tube relative to the support tube to expose the support tube as the layers are formed on the support tube;

the successive folded concentric layers each having an inner diameter and an outer diameter, the inner diameter of each layer being adjacent the support tube and being equal to the support tube diameter, and the outer diameter of each layer being spaced away from the support tube and being greater than the support tube diameter and at most equal to the transfer tube diameter.

2. A method according to claim 1, wherein the transfer tube has a frustoconical lower end adapted to pass the tubular net from the transfer tube and onto the support tube, as the tubular net is folded onto the support tube and as the transfer tube moves relative to the support tube.

3. A method according to claim 2, including a base connected to the end of the support tube for retaining the layers of tubular net on the support tube, the base being larger in diameter than the support tube diameter.

* * * * *